United States Patent [19]

Moore

[11] 3,778,780

[45] Dec. 11, 1973

[54] OPERATION REQUEST BLOCK USAGE

[75] Inventor: Brian B. Moore, Wappingers Falls, N.Y.

[73] Assignee: International Business Machines Corporation, Armonk, N.Y.

[22] Filed: July 5, 1972

[21] Appl. No.: 268,959

[52] U.S. Cl. .................................. 340/172.5, 444/1
[51] Int. Cl. ............................................. G06f 9/00
[58] Field of Search ........................ 340/172.5; 444/1

[56] References Cited

UNITED STATES PATENTS

| | | | |
|---|---|---|---|
| 3,639,912 | 2/1972 | Campbell | 340/172.5 |
| 3,303,474 | 2/1967 | Moore et al. | 340/172.5 |

*Primary Examiner*—Raulfe B. Zache
*Attorney*—Robert Lieber et al.

[57] ABSTRACT

Instruction SIGNAL PROCESSOR, devoted to initiation of input/output control between an initiating data processor unit and a respondent unit, is used to implement dispatching operations by transferral of Operation Request Block (ORB) storage space addressing intelligence and interruption priority level intelligence from the initiating unit to the respondent unit. The priority level intelligence is prepared by the initiating unit in said space and thereby implicitly conveyed with the addressing intelligence. The ORB space is accessible to both units. After execution of the instruction the units disconnect and the respondent unit, when in suitable enabled status, independently performs the dispatched operation generally designated by order code intelligence transferred to it during the instruction execution sequence. Upon completing such operation the respondent unit signals request for priority interruption of the initiating unit at said priority level. When this request is accepted the units reconnect and the respondent unit revertively transfers the ORB space addressing intelligence to the initiating unit enabling the latter to examine messages placed in the ORB space by either unit (e.g. final status of respondent unit, storage address of I/O information transfer, address of program whose execution is contingent upon completion of the dispatched operation, etc.)

11 Claims, 8 Drawing Figures

FIG. 1

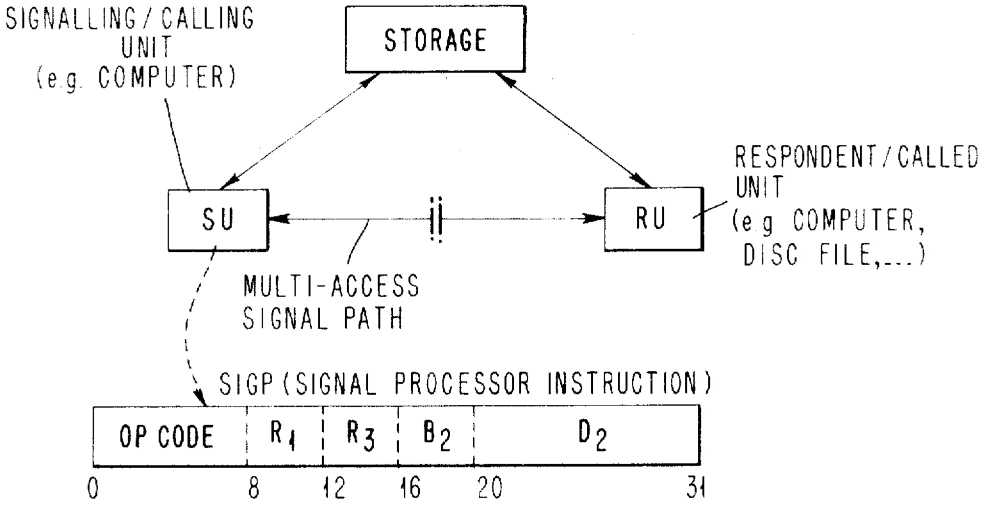

LEGEND:

$R_1, R_3, B_2$: GENERAL REGISTERS OF SU $[R_1], [R_3], [B_2]$: CONTENTS OF $R_1, R_3, B_2$ RESPECTIVELY $[R_3]$ = IDENTITY OF CALLED UNIT RU $[B_2] + D_2$ = ORDER CODE (OPERATION TO BE PERFORMED BY RU)

$R_1$: REGISTER TO CONDITIONALLY RECEIVE SUPPLEMENTAL STATUS OF RU WITH EXCEPTION CONDITION RESPONSE OF RU OR AS EXPRESS RESPONSE TO SENSE ORDER

ODD $R_1, R_1 + 1$; MAY CONTAIN ADDITIONAL INTELLIGENCE SUBJECT TO BE TRANSFERRED TO RU; THE INTELLIGENCE MAY BE SUBJECT EITHER TO VOLUNTARY TRANSFER BY SENDER SU OR DEMAND-RESPONSIVE TRANSFER AT RECEIVER REQUEST

OPERATION REQUEST BLOCK USAGE

CROSS REFERENCE TO RELATED APPLICATION

U. S. Pat. application Ser. No. 268,268 entitled "SIGNAL PROCESSOR INSTRUCTION FOR NON-BLOCKING COMMUNICATION BETWEEN DATA PROCESSING UNITS," by B. B. Moore, A. Padegs and R. M. Smith, filed July 3, 1972.

BRIEF SUMMARY OF THE INVENTION

The invention pertains to efficient execution of input-output dispatching operations between segments of a data processing program. The subject technique of Operation Request Block (ORB) usage, particularly in association with control initiating instructions SIGNAL PROCESSOR as described in the above cross-referenced patent application, facilitates quick establishment of quickly pre-emptable control initiating communications and management of an associated dispatching function. The subject technique is particularly effective in sensor-based process control systems which require dynamic communication between multiple process sensors and central processing units (CPU's) and between the central units and control actuators; all CPU tasks subject to efficient pre-emption on a priority basis.

The control initiating instruction SIGNAL PROCESSOR, hereinafter SIGP, more specifically described in the above cross-referenced application of Moore et al is designed to provide for quick establishment of a control initiating exchange transaction between the executing CPU and a respondent unit designated by the information of the instruction (e.g., an I/O channel). The executing CPU hereinafter subject (or sender) unit SU, attempts to establish signal connection to the designated respondent unit, hereinafter RU, receiver or respondent unit, through a multiplex connection system.

If the receiver and connection system are available and operational, the sender supplies the receiver with a control initiating order code designated by the instruction information. This code is subject to interpretation by the receiver as a command to perform a specific function usually continuing after severance of the sender-receiver connection. If the receiver has a specific exception status, it provides corresponding signals to the sender during the course of execution of the instruction and the sender retains the specific status in one of its registers designated by the instruction, subject thereafter to handling with program status information of the sender, leaving sender and receiver free to accept pre-emptive interruption without further transfer handling of exception status intelligence. The connection is severed and the initiating operation terminated upon setting of a condition code in the sender. This code is indicative of the status of completion of the control initiating function (complete/no exception, complete/exception, incomplete/busy connection (or busy receiver) or incomplete/receiver not operational).

As part of the "complete/no exception" transaction the sender transfers and the receiver retains an address word. This word (also termed ORB pointer) identifies a predetermined word address position within a multiword Operation Request Block (ORB) space in shared storage. This space is assigned and prepared by a supervisory program of the sender to be subject to access and use by the receiver. The preparation includes storage in the space of linking information (hereinafter Dispatch Pointer) identifying a dispatched task routine of the sender's program which depends upon the controlled operation and to which the sender's program must return upon normal successful conclusion of the controlled function. The preparation of the ORB space also includes provision of information identifying other separate storage space containing the (I/O) program required by the receiver to perform its initiated function and of information identifying a priority level assigned to the receiver at which it must request interruption of the sender when it later completes its control task. At completion of the control task at an indeterminate later time, the receiver requests priority interruption of the sender at a level corresponding to the level indication in the ORB.

When enabled for interruptions at this level the sender is interrupted and presented by the receiver with the ORB pointer information. The sender supervisor program uses this information to locate and activate the dispatched problem program task routine in the active queue and releases the ORB space for re-use in other functions.

The ORB space represents a minimal serially reusable resource (resource subject to allocation to one user at a time) by comparison to the amount of channel status storage space normally required for the above dispatch function. The handling as above requires considerably fewer instructions and operation cycles of sender and receiver than would otherwise be required. The handling is subject to pre-emptive interruption with minimal delay of higher priority pre-emptive functions.

The foregoing and other features, characteristics, objects and advantages and underlying assumptions of the present invention will be more fully appreciated and understood by considering the following particular description thereof.

DESCRIPTION OF THE DRAWINGS

FIG. 1 illustrates the system applicational environment and code format of the control initiating instruction SIGP.

DETAILED DESCRIPTION

Introduction

It is assumed that the person skilled in the art to which this invention pertains is one having extensive acquaintance with the hardware and software organization and operation of the IBM System/360 and IBM System/370 Data Processing Systems including the peripheral device interfaces thereof and the handling of the input-output functions therein. Organizational and hardware/architectural aspects of these systems are variously described in "IBM System/360 Principles of Operation" Form A22-6821, File S360-01, "IBM System/370 Principles of Operation" Form GA22-7000 and one or more of the available publications relating to particular system models (IBM System/360 Models 20, 25, 30, 40, 50, 65, 67, 75, 95 and System/370 Models 145, 155 and 165). Familiarity with the organization and function of the associated Operating System (OS) software is also assumed. In regard to OS software, teachings of the following publications are incorporated herein by the following reference:

IBM System/360-370 "OS Release 20", Forms:
- GC28-6534 "Introduction to OS"
- GC28-6535 "OS Concepts and Facilities"
- GC28-6628-6 "System Control Blocks"
- GC28-3746-0 "Operating System Data Management Services"
- GC28-6647-5 "Supervisor and Data Management Macroinstructions"

IBM System/360-370 DOS:
- GC24-5030-9 "Concepts and Facilities"
- GC24-3427-7 "Data Management Concepts"
- GC24-5036-6 "System Control and System Service Programs"
- GC24-5037-10 "Supervisor and Input/Output Macros"

Figure 6:
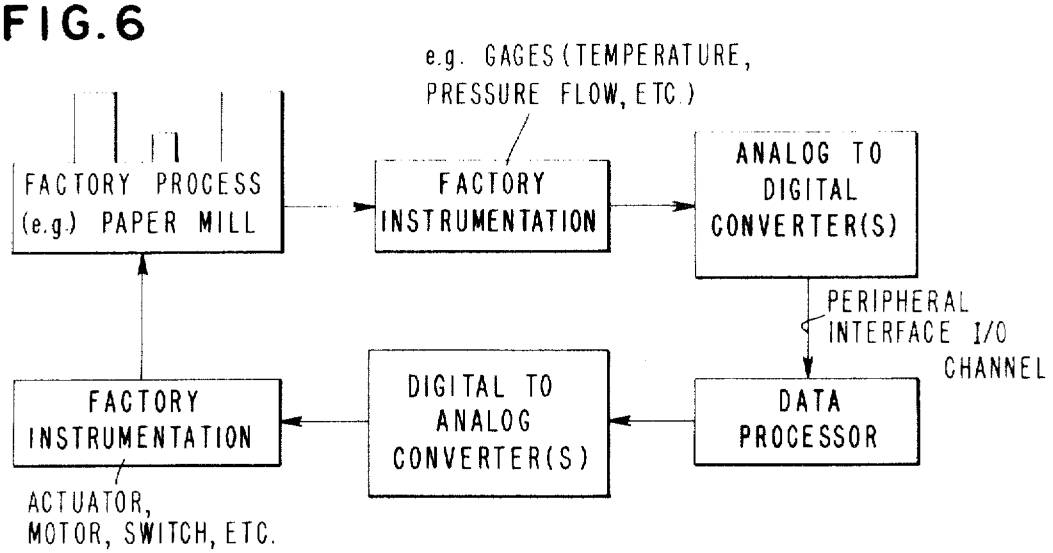
FIG. 6 indicates an exemplary factory process control system involving dynamic communication between sensors, actuators and a central data processor in which the various sub-processes must be maintained subject to priority pre-emption with minimal impedance of preempting sub-processes or functions.

Referring to FIGS. 1 and 6, the general environment in which the present invention is highly useful includes a subject unit SU, which for instance would be a central processing unit or CPU, and an object unit RU, which for instance would be an I/O channel or another CPU. These units have a signal path for information exchange permitting SU to perform control initiating functions in respect to RU and they also have shared storage means as indicated in FIG. 1 which would be at least partially accessible to both units. It is contemplated that the signal path between the units may be either multi-accessible or subject to multiplex usage.

It is contemplated further that the environment of operation is dynamically pre-emptive in the sense that the subject CPU requires the capability to be pre-emptively interrupted or seized for timely performance of higher priority functions.

Thus, it is required that control initiating functions involving connection of SU with RU should present minimal obstruction to possible pre-empting functions and also it is required that initiated control functions (e.g., input-output operations of RU) be carried out with dispatch so as not to unduly impede, obstruct or delay operations of SU that may be dependent upon the completion of the controlled operation.

It is further contemplated that the handling of the controlled operation and its linkage back to problem programs in SU which are dependent upon completion of the controlled operation should be so carried out that contention "bottlenecks" due to use of serially reusable resources (i.e., resources such as fixed storage addresses or fixed registers which are subject to usage by plural users but only one at a time) are reduced in comparison to known earlier methods.

It is also contemplated that SU will be capable through the Supervisory Program of designating multiple address spaces in the storage means of FIG. 1, as serially reusable ORB resources on a demand/availability basis as required to handle the controlled operations utilizing the technique described below.

Referring to FIG. 6, the exemplary environment of the invention comprises a dynamic process control system; for instance a paper mill with sensors to monitor process variables, actuators to control process changes and conversion devices to convert the sensor outputs to digital form and the digital inputs to the actuators to analog form. Such systems further comprise a data processor which performs the necessary processing and management of the sensor data, the actuator control inputs and other incidental functions. It is further contemplated that the data processor system may include the system of FIG. 1 and may be subject to extensive multiplex usage in other processes.

In order to carry out the process management program (hereinafter problem program) the CPU of the data processor must be capable of passing to the I/O units RU of the processor with minimal obstruction of pre-empting functions, control initiating signals which initiate controlled input/output operations of RU in respect to the shared access storage facility and which permit RU to quickly direct SU to the dispatched point in the problem which relates to the controlled operation and to the information acquired or dispensed in that operation.

In order to accomplish the foregoing with a high order of pre-emption efficiency, the present invention provides for passage from SU to RU, during the control initiating operation, of an ORB address pointer parameter. This parameter points to the Operations Request Block (ORB) previously mentioned and is retained by RU for the duration of its operation in respect to the initiated function. The ORB space is prepared, usually by SU through its Supervisory Program, in contemplation of the control initiating operation. The ORB preparation includes another address pointer parameter (hereinafter dispatch address pointer) which points to another storage space which contains the part or point of execution of the problem program which depends upon the controlled I/O operation or otherwise should naturally follow it in time sequence.

The ORB also contains several additional subspaces of information. These include prepared address pointers defining the address range in yet another space of an I/O program to be used by RU in carrying out its controlled operation and a sub-space for entry of RU status upon conclusion of the controlled operation.

At conclusion of its controlled operation, RU enters status in the above-mentioned ORB sub-space and posts a request, at a given level, for priority interruption of SU. The level of this request is designated by level information prepared by the supervisor in one of the above ORB sub-spaces. The use of this expedient prevents the interruption from potentially interferring with other higher priority functions of SU.

When enabled for interruption at the posted level, SU interrupts and is presented by RU with the ORB pointer parameter. SU under Supervisor Program Control uses this parameter to examine the RU status entry of the ORB and, if status indicates successful completion of the RU function, to utilize the dispatch pointer to effect continuance of the "dispatched" problem program routine. If status indicates non-completion of the RU function, the supervisor takes diagnostic or corrective action as appropriate.

Instruction Format/Information Content

Referring to FIG. 1, a preferred exemplification of the subject instruction SIGNAL PROCESSOR, abbreviated SIGP, consists of a 32 bit word in which 8 bits designate an operation code, three sets of 4 bits designate three respective general registers R1, R3, B2 of the executing-initiating processor and twelve bits designate a quantity D2 used as an addend factor of the order code. One of the designated general registers R3 contains (as a consequence of earlier handling or loading the identity of the respondent/object unit RU. The order code designating the intended function to be initiated by RU is formed by adding D2 and the contents of B2. It should be understood that the general registers of the executing unit are registers which are more quickly accessible during normal operation than the addressable storage spaces of the system (i.e., main or other storage) and are subject to "saving" and "restoration" transfer operations relative to the latter during pre-emptive interruption of the initiating unit.

Operation of the Instruction

Figure 2:
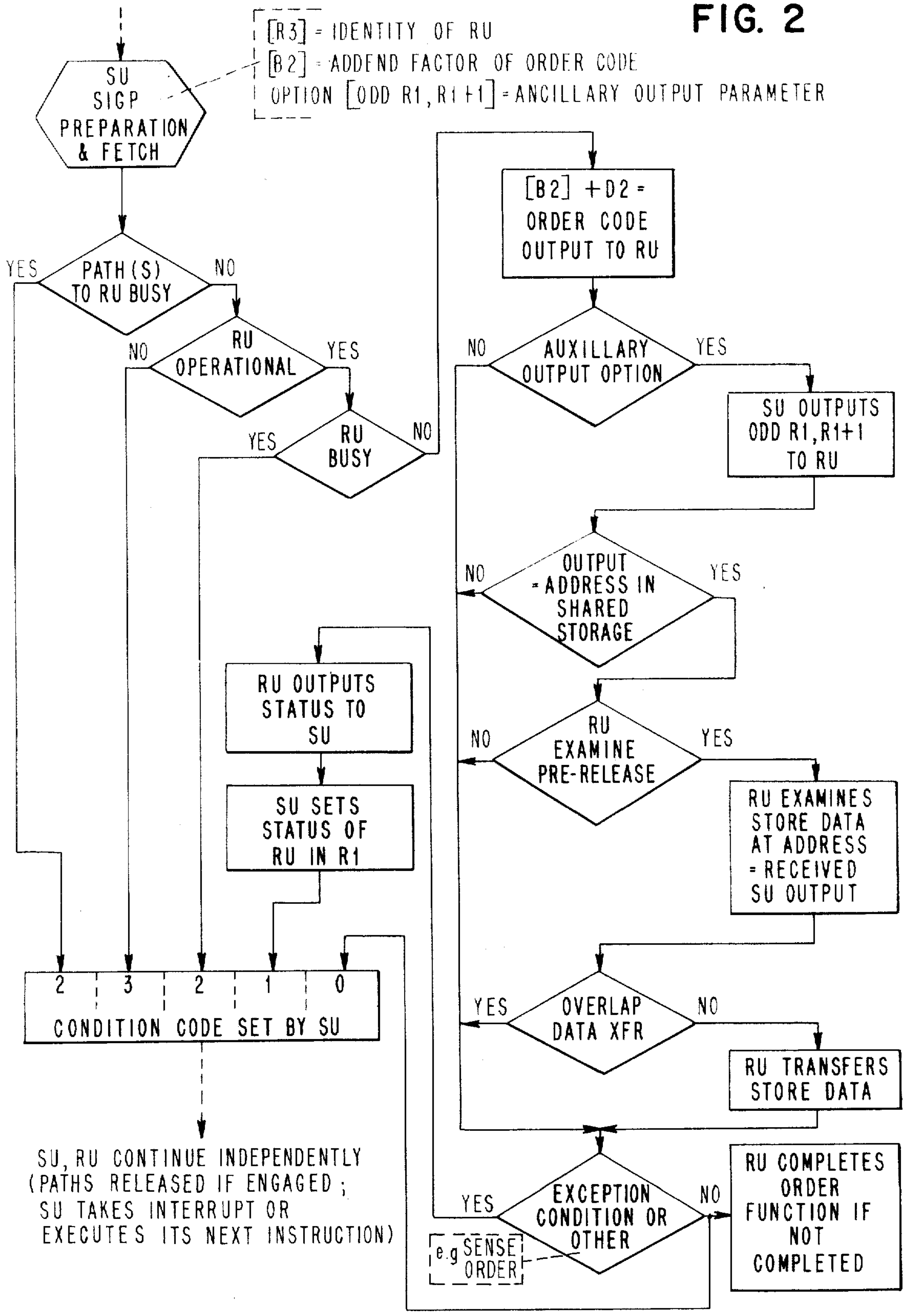
FIG. 2 illustrates the control initiating sequence characteristic of sender CPU and receiver (e.g. I/O channel) cooperation during execution of the SIGP instruction.
Figure 4:
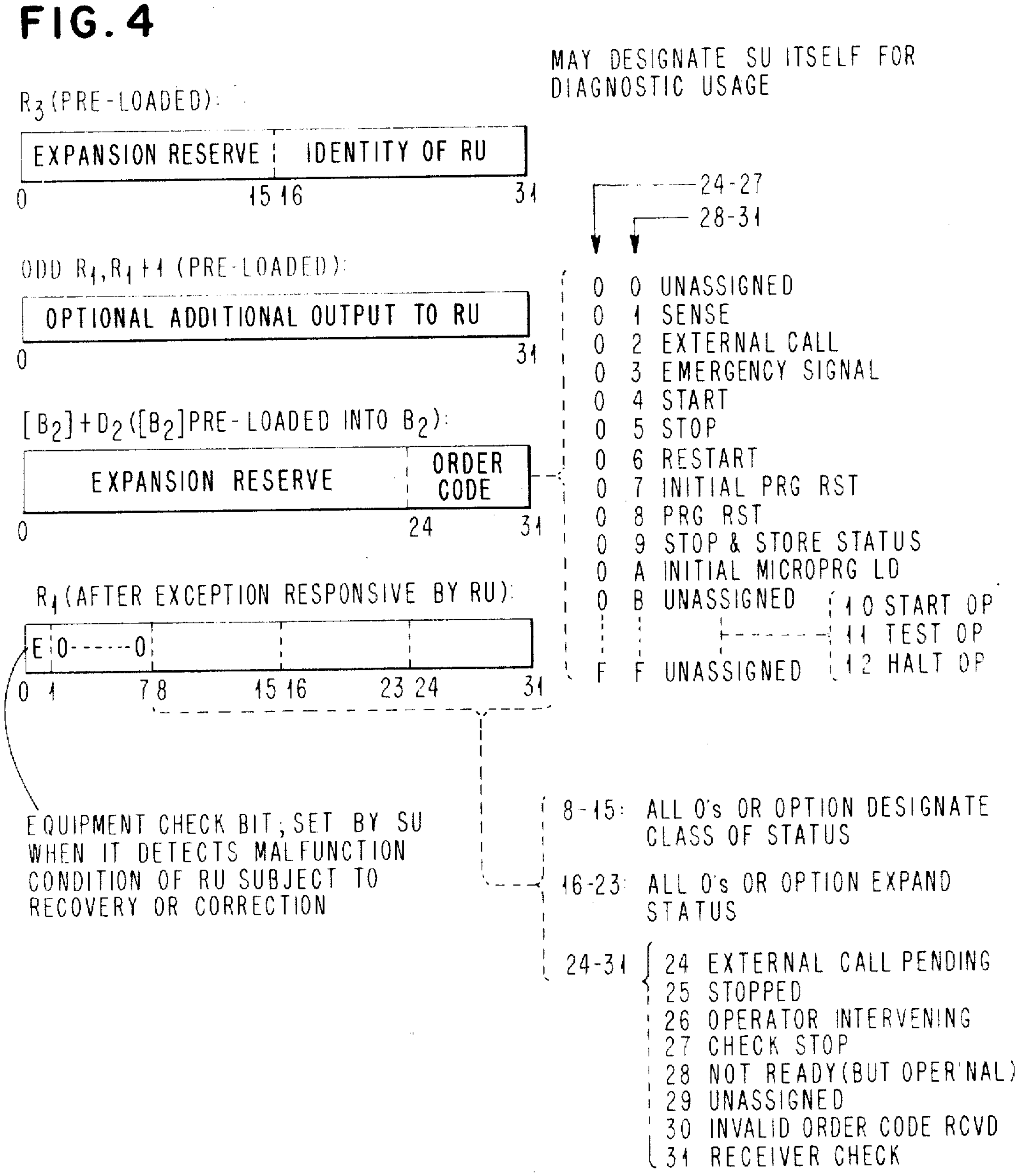
FIG. 4 illustrates general register and arithmetic logic usage in the executing unit during execution of SIGP.

Referring to FIGS. 1, 2 and 4, the specific control sequence of operation for execution of SIGP is as follows:

Prior to execution general registers R3 and B2 (and optionally the odd one of R1, R1+1) are appropriately loaded (by operations of load instructions or otherwise) with the requisite information. The content of R3 (written as [R3]) designates the identity of the receiving unit RU. The order code represented by the sum of [B2] and D2 is subject to conditional transfer to and interpretation by RU for control initiation. When the four bit field, B2, is zero, the quantity D2 represents the order code. Specification by the B2 field of a register, other than zero, provides expansion and adaptability reserve in reference to specification of the order code.

The register designated by the odd integer of the integer pair R1, R1+1 contains the ORB address pointer parameter mentioned previously. The specific organization of the ORB and the specific handling of this pointer are discussed later. It will be understood that the pre-loading or preparation of registers R3, B2, odd R1, R1+1 may be effected through program instructions (e.g., Load instructions).

Register R1 specified in SIGP is subject to unique conditional usage, during execution of the instruction, as retention buffer for specific exception status intelligence of the respondent unit presented and entered in response to a transferred SIGP order code (e.g., intelligence to indicate error in the order code, pendency of higher priority function, etc.).

The control sequence of the SIGP instruction operation is indicated in FIG. 2. The arrangement of the general register information, as embodied in the implementation for simple communication with another CPU, is shown in FIG. 4. The requisite sequence control hardware will be apparent to those skilled in the subject art; for instance, in a microprogrammed system, this would comprise a sequence of conventional microinstructions appropriate to the tasks of operating the conventional signal gates and arithmetic elements of the executing unit to produce the order code (sum of [B2] and D2) and to provide the signal flow and control initiating signal transactions next described.

The SIGP instruction is fetched and decoded initiating attempt by the executing/calling unit to establish connection with the object unit RU (= [R3]). If connection is unavailable or if the object unit is busy condition code 2 is set internally; for instance in appropriate internal condition triggers of the executing unit, and the operation is quickly terminated. Naturally the instruction transaction may be subject to later repetition via a program branch conditioned upon the existence of a condition code 2 setting.

If the object unit is not operational (e.g., malfunctioning, disconnected or non-existent) condition code 3 is set and connection to RU is released. Naturally this occurrence would be subject to subsequent evaluation by diagnostic and recovery programs of the executing unit, If the called unit is operational, the order [B2] + D2 is presented over the connection. RU examines the code and provides a return indication to SU during the instruction execution sequence. Condition code 0 is set in SU when a simple acknowledgment response is detected and condition code 1 is set when RU indicates that additional information, normally in the form of specific exception (sense) status conditions is returned. It is within the purview of our invention, however, to have other additional information in the form of immediate data also presented in this manner for certain order codes. As a condition precedent to the setting of the exception condition code 1, the additional information from the RU is presented to SU and entered into register R1 of SU designated by the instruction. This Sense status is subject to retention for diagnostic or repetition usage; e. g., for error recovery if the exception condition response is due to correctible error, or for diagonosis of uncorrectible error, or for repetition of the SIGP operations, etc. Upon entry of the information into R1; both SU and RU, and the connection path, become subject to pre-emptive interruption and the execution of the instruction may be terminated.

The order code is subject to interpretation by RU (it is contemplated for instance that different receivers may be adapted to perform different functions in response to like codes). In each instance above setting of the condition code concludes the SIGP operation and prepares the initiating unit SU for interruption or execution of its next instruction. In each instance, the setting of the condition code also concludes the control initiating transaction of the SIGP operation to the extent that it has been performed and leaves the calling unit, called unit and connection path (if one has been established) subject to pre-emptive interruption; hence the basis for earlier characterization of SIGP as subject to non-blocking quick release usage.

Upon receipt of the order code RU may also receive the ancillary output of SU [odd R1, R1+1 of SU] as previously explained. If this information represents a storage address there are two system options suggested in FIG. 2. One is that RU may retain the address information for reference after severance of the SIGP connection with SU. The other contemplates that RU will refer to the designated storage address while still connected with SU. In the latter circumstance additional options considered include the possibility of RU transferring (reading or writing) data.

Order Code Functions

Three functions of interest in the present case are provided for communication between the CPU and a subsystem element. There are two modes of execution for subsystem functions: immediate and non-immediate. When a function is executed in the immediate mode, the entire function (including any data transfer and status reporting) is executed prior to the subsystem's response to, and consequently prior to the setting of the condition code for the SIGNAL PROCESSOR. No interruption is generated as a result of the function. In the non-immediate mode, the execution of SIGNAL PROCESSOR is completed prior to the completion of the function. External interruptions signal conditions arising during execution of the function.

The functions are specified by a function code in bit positions 24–31 of the SIGNAL PROCESSOR order code (reference FIG. 4). The function codes are the binarily encoded equivalents of the following decimal numbers:

| Function Code | Function |
|---|---|
| 10 | Start Operation |
| 11 | Halt Operation |
| 12 | Test Operation |

The functions are defined as follows:

Start Operation — The subsystem is requested to execute the operation indicated by words of the ORB. The operation is executed in the non-immediate mode.

Halt Operation — Any operation being executed by the device indicated in the ORB is terminated in the manner specified by the System/370 instruction HALT DEVICE. The Halt Operation function is executed in the immediate mode. This does not mean, however, that the operation has been terminated at the completion of the Halt Operation function. The status register associated with Halt Operation contains only status associated with the Halt Operation function. Conditions associated with the operation being terminated are reported in the ORB associated with that operation.

Test Operation — Any status associated with an operation being executed by the device indicated in the ORB is placed in words 2 and 3 of the ORB (refer to FIG. 5 and ORB description below). This corresponds to programmed acceptance of an interruption, so this status is not presented to the CPU as part of any future interruptions.

Explanation of the other functions indicated in FIG. 4, which are not necessary to an understanding of the present invention, are available in the above cross-referenced patent application.

Exception Bit definition

Exception status bits receivable in R1, of the initiating unit represent and are subject to retention and handling as program status information. These bits are shown in FIG. 4 and defined more particularly as follows:

Bit 0 — Equipment check bit; when set to 1 provides indication to the calling unit of errors affecting only the execution of the immediate SIGP instruction (in contrast to bit 31 providing reference indication to the called unit). Can be subsequently evaluated via Machine Check interruption in the calling unit.

Bits 1–7 — Unused; all 0's.

Bits 8–15 — Either unused (all 0's) or used to designate class of exception status stored in bits 24–31.

Bits 16–23 — Unassigned (all 0's or expansion reserve.

Bits 24–28 — When set indicate the presence of the corresponding condition in the addressed receiver at the time the SIGP order code was received. These indications are provided only in response to the Sense order in exception circumstances precluding successful performance of the control function designated by the order code.

Assigned functions, definitions and purposes of exception bits 24–31 are indicated specifically as follows with reference to FIGS 2 and 4:

External Call Pending: This bit is set to one when an external-call condition is pending for interruption of the receiver; e.g., due to a previously issued SIGNAL PROCESSOR instruction. The pending condition may be due to signalling from the same or another sender. The condition, when present, is indicated in response to Sense and External Call orders. Additionally, for External Call it means that the requested interruption condition has not been generated in the receiver.

Stopped: This bit is set to one when the receiver is in the stopped state and the order code specifies Sense.

Operator Intervening: This bit is set to one when the receiver is executing certain operations initiated from its console or remote operator control panel. The particular manually initiated operation that cause this bit is to be turned on in the sender will depend on the type of receiver unit and the function specified. It is understood that the specified order function cannot be performed and will not initiate. Operator-Intervening status can be signalled as exception response to any order code function.

Check Stop: This bit is set to one when the receiver is in the Check Stop state. The specified order function cannot be performed and is not initiated. The condition, if present, is indicated in response to all assigned functions except IMPL, program reset, and initial program reset.

Not Ready: This bit is set to one when the addressed receiver uses reloadable control storage to perform the specified order function and the required microporgram is not present. Therefore the function is not initiated. The condition, if present, is indicated in response to all assigned functions except Initial Microprogram Load.

Invalid Function: This bit is set to one when the addressed receiver receives an unassigned order code. No function is performed at the addressed CPU. When the receiver is in the Operator-Intervening state, Check-Stop state, or Not-Ready state, either Invalid Function or the corresponding state condition, or both may be indicated.

Receiver Check: This bit is set to one when the addressed CPU detects malfunctioning of equipment during operations associated with the execution of SIGNAL PROCESSOR, including reception and interpretation of the order (function) code. This condition can be signalled in response to any function code and indicates that the execution of the function has not been and will not be initiated. The other status bits need not necessarily be valid. A Machine-Check condition may or may not have been generated at the receiver.

Programming Notes

A CPU can obtain the following functions by addressing SIGNAL PROCESSOR to itself:

1. Sense order permits SU to store in designated R1 indication of whether an External-Call interruption condition is or is not pending.

2. External Call and Emergency Signal orders enable the corresponding interruption conditions to be generated. External Call can be rejected because of a previously generated External Call condition.

3. Start sets condition code 0 and has no other effect.

4. Stop causes SU to set condition code 0, take pending interruptions for which it is enabled, and enter the Stopped state.

5. Restart provides a means to store the current PSW.

Hardware Notes

The Equipment Check bit (bit 0 of R1 when exception condition code is set) and Receiver Check bit (bit 31 of R1) provide a means of signalling malfunction to the sender. Additionally, when the Receiver Check bit is turned on it is subject to being made available to the receiver so that the receiver can take a Machine-Check interruption to record a logout concerning the hardware malfunction. When the equipment check bit is turned on, the CPU executing SIGNAL PROCESSOR can take a Machine-Check interruption to examine further the circumstances of the malfunction.

Figure 5:
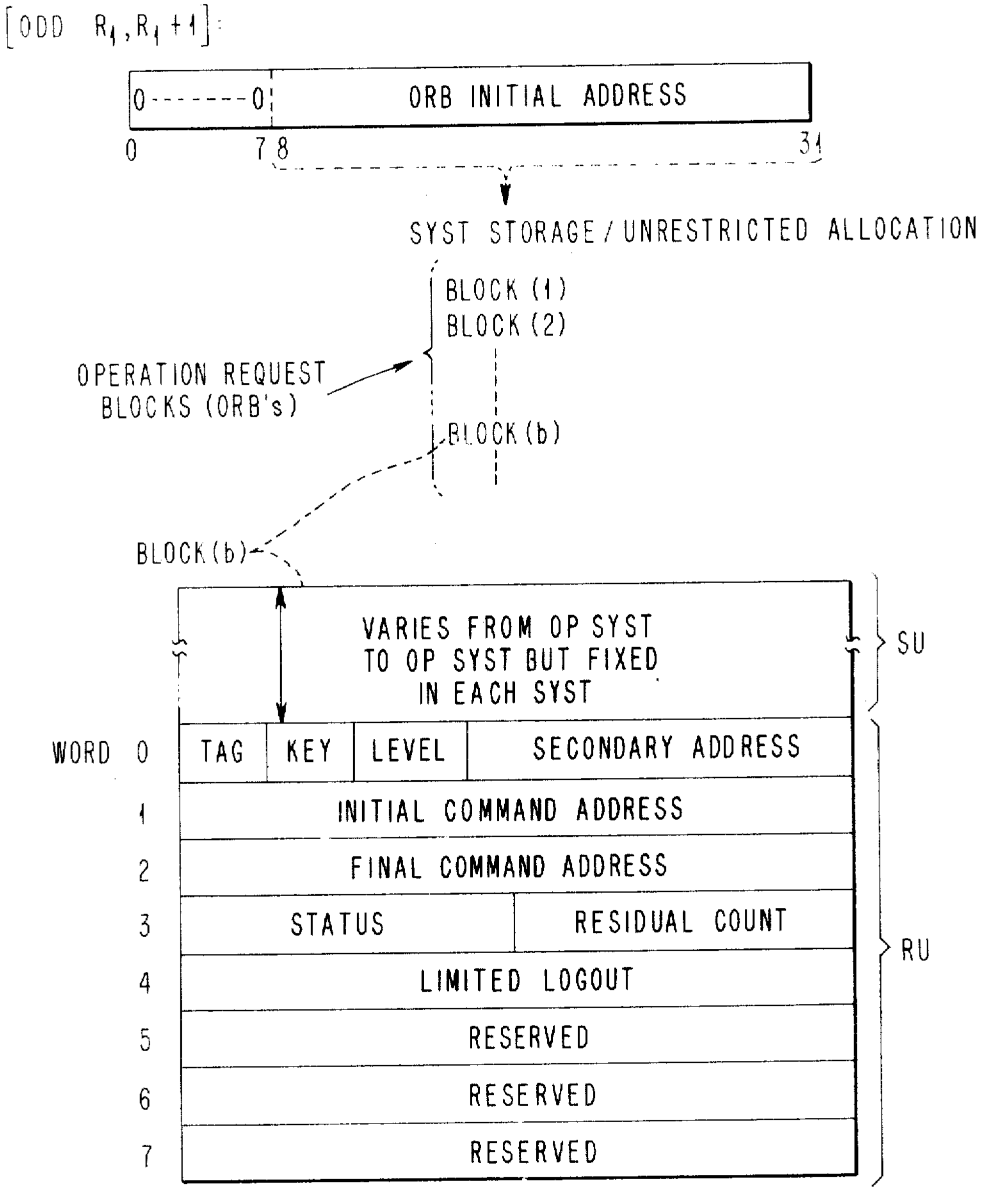
FIG. 5 indicates the sender CPU register serving as the source of the ORB address pointer (ancillary parameter) and the form of the ORB storage space and contents.

ORB Organization (FIG. 5)

Shown in FIG. 5 is the 32 bit ORB pointer parameter as formed in [odd R1, R1+1] prior to SIGP execution and as retained in not shown storage elements of RU during the succeeding operaton of RU. These storage elements are preferably but not necessarily a discrete reserved hardware register of RU. Since the particular form of retention of the ORB pointer in or by RU is not of interest to the invention, but rather only the fact of retention as will be seen later, the particular register is not expressly illustrated.

Also shown in FIG. 5, leading down from the ORB pointer are a group of storage block spaces allocatable as ORB spaces when one of the groups (Block (b)) shown in detail as configured in ORB usage. The block contains eight 32 bit word subspaces (words 0, 1, . . . , 8) allotted to and prepared for RU, and additional prepared sub-space allotted for the dispatch address pointer (in the present exemplification, one word is sufficient, but more may be provided in other applicational systems).

The ORB pointer is the storage address of the first byte of word 0 and all other ORB words are accessed by arithmetic manipulation of signal "copies" of the ORB pointer (with the pointer retained as mentioned).

Thus, the dispatch pointer location (word-1) is formed by subtracting 4 (i.e., four byte address units) from a representation of the ORB pointer, and other ORB words or bytes are referenced correspondingly. Hence RU includes by implication, although this is not shown to avoid complicating the illustration, means to effect incremental manipulation (counters or arithmetic circuits) at least as would be required to address words 0–7 in the ORB space (word 1 is not subject to access by RU and is not used by RU as will be seen later).

Words 0–7 of the ORB contain control information for RU as defined below and address pointers to the storage space holding the I/O program for the RU operation. Word 0 comprises 4-bit Tag and Key functions, an 8-bit (one byte) Level function and a 16-bit (two byte) Secondary Address function. Words 0–7 are defined as follows:

Tag: Indicates class of ORB if applicable.

Key: Indicates storage protection key for enabling RU access to shared storage.

Level: Indicates level at which RU can request interruption of SU.

Secondary Address: Indicates identity of subservient device functioning under control of RU in connection with the operation.

Initial command Address is address of first command of I/O program for RU as set preparationally by supervisor of SU. Final Command Address is address set by RU to indicate the incremented last command address reached prior to termination of operation (i.e., reach upon entry of status).

Status: Indicates status of RU at termination of operation. May indicate incomplete as well as complete operation.

Residual Count: Indicator of the residuum of unperformed data transfer functions (similar to Residual Count handling of System/360 CSW).

Limited Logout: Allows for further status information entry by RU; usually used in malfunction situations.

Reserved: Available for other functions or expansion, etc.

System Operation

Figure 3:
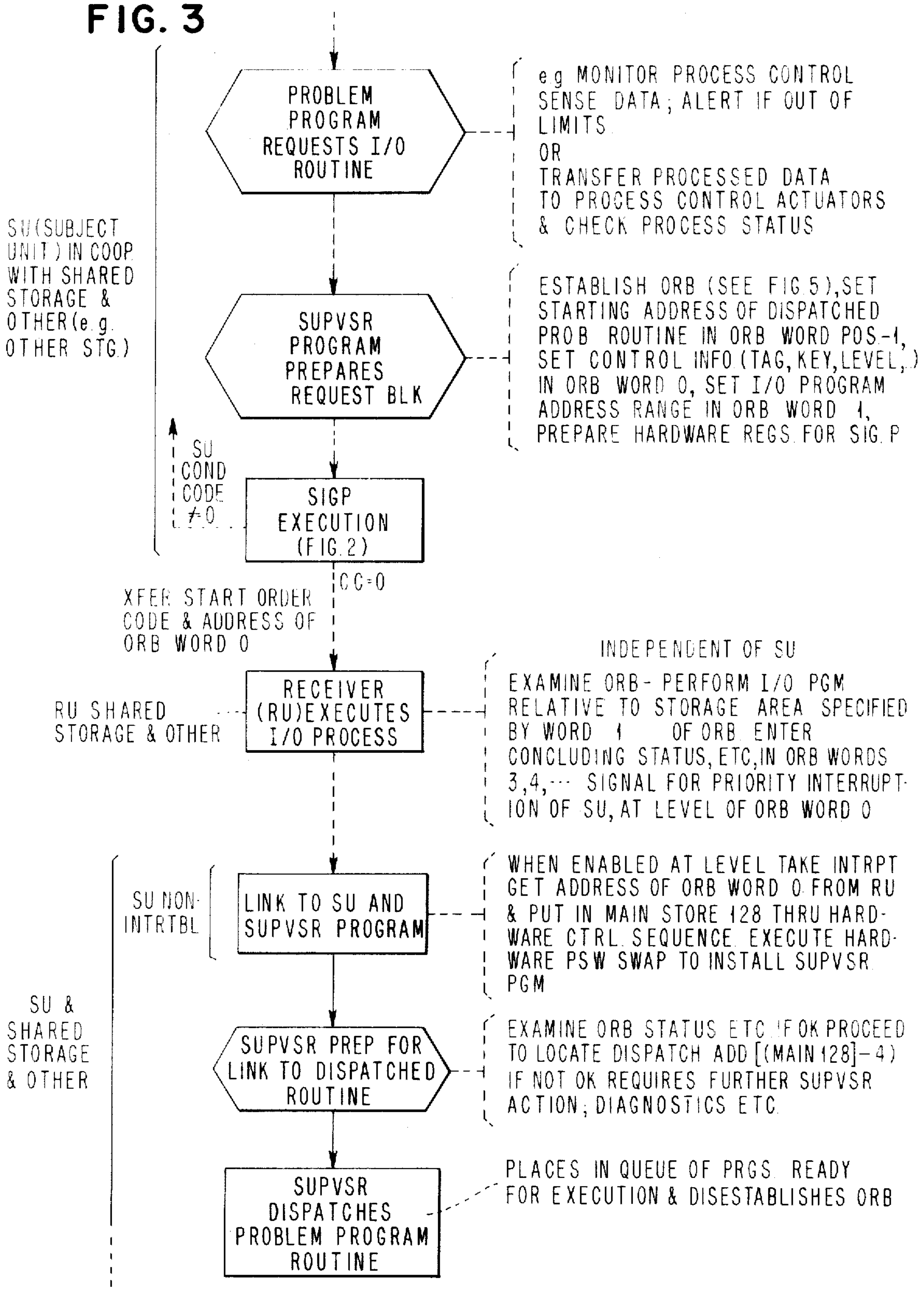
FIG. 3 illustrates the control flow sequence of the interactive dispatch function of sender and receiver units accomplished through initiating action of SIGP and separate followup actions of receiver and sender units.

In typical system operation (FIG. 3) a problem program running in the SU system reaches a "dispatch point" where further running is dependent on an I/O operation (for instance monitoring for an "out-of-limits" process parameter contingency — see also FIG. 6). The Supervisor program is brought in to prepare an ORB and the registers of a SIGP instruction as indicated in the second block of FIG. 3.

Upon execution of SIGP, assuming effective control initiation (i.e. RU available, operational and no exception status), the SIGP order function (see FIG. 4) is initiated by RU and the ORB pointer transferred from SU to RU remains resident in RU. The advantage of this and of the dispatch pointer handling will be explained later.

RU examines the ORB space (either before or after severance of its connection with SU depending upon whether such examination is or is not a factor of its SIGP exception response to SU) and assuming that no error or other exception is found, RU proceeds with the I/O operation. In this operation, it references ORB word 1, the address of which is ORB pointer increased by 4, for its initial command address. Thereafter, it handles consecutive (or chained) commands and increases the command address successively by 8 until its operation concludes (either due to completion or due to circumstance preventing completion). At conclusion, the last command address increased by 8 is stored in ORB word 2 as Final Address information and Status of the operation and Residue Count are entered in ORB word 3 by RU.

Naturally, it is understood by those skilled in the art that RU would include the means to carry out these data handling and address incrementing operations (i.e., the necessary arithmetic or counting circuits, logic gates and sequence controls or microprograms).

Upon conclusion as above RU posts a request for priority interruption at a level corresponding to the level indication of ORB word 0 (e.g., on an appropriate combination of lines or in other form indicative of the level and subject to interpretation as such by the controls of SU).

When enabled (i.e., unmasked) for the indicated level SU takes the priority interruption. For this operation SU and RU are hardware controlled to have RU present a representation of the ORB address pointer and SU place the same in its fixed Main Store address space number 128. The controls of SU are further configured to cause an immediate PSW swap installing the Supervisor program in control. From the time it takes the priority interruption until its Supervisor PSW is installed in control SU is "frozen" in an uninterruptible mode of operation by its controls so that it may not be interrupted during the handling of the ORB pointer over to the Supervisor program without "permission" of the Supervisor. The importance of this will soon be appreciated.

Once in control the Supervisor uses the ORB pointer in Main Store 128 to locate the ORB. The information in the ORB (RU status, etc.) is examined and if proper the "dispatched" routine of the original problem program is located via the dispatch pointer in ORB word space −1, and activated (e.g, placed in the active program queue, etc.) If the ORB information is improper the Supervisor takes appropriate remedial or diagnostic action.

In either case above, after the relevant information in the ORB has been passed over to the control of the Supervisor, the ORB may if needed be released for other usage by appropriate de-assignment and/or reassignment Supervisor procedures.

Advantages — Tracing the handling above of the dispatch pointer in ORB word-1 it is seen that control passes to RU during the I/O operation and reverts to the Supervisor at the conclusion of the I/O operation. Thus the Supervisor does not have to hold the dispatch pointer in any of its own special hardware or storage work space (the latter requiring more tedious table look-up software procedures for retrieval of the information) and the minor penalty paid is that the ORB space, which is useful and necessary for the RU operation and which may be appropriated from a virtually limitless supply of undedicated space, is enlarged by only one word space.

Another advantage of the foregoing SIGP-ORB handling procedure is that it replaces Start I/O and Channel Status and Address Word (CSW and CAW) handling with relative improvement in operating efficiency and pre-emptability of SU. SIGP is seen to permit preemption of SU in all instances as soon as the condition code is set (whereas a Unit Check response on a Start I/O would require a further Sense transaction between SPU and I/O paths).

Another advantage in the dispatch function handling is that the setting of status by RU before the request for interruption of SU eliminates the delay associated with CSW handling and post-transfer of status.

Another advantage is the quick and effective initiation accomplished via SIGP. The use of program designatable registers to hold instruction parameters (especially RU exception status) offers advantage over the fixed storage usage in CSW handling (main store 64). The provision and transfer of an order code extends the power of the instruction relative to SIO (Start I/O) allowing specification of multiple orders (and therefore control interaction with multiple different devices).

The ORB Level indication usage is particularly effective; matching the interruption handling of the RU request to the real priority conditions of SU (which establishes the indication). This eliminates tedious software queueing and excess handling in response to unprioritized interruptions.

The handling of the interruption via main 128, with SU in non-interruptible running condition, replaces the more tedious handling of CAW, CSW, IOCA and Interrupt codes.

In all respects the handling presents reduced delays to pre-emptive interruption of SU by higher priority functions.

In summary then the subject technique is more efficient in at least the following respects:

1. It provides a more efficient dispatch mechanism (ORB pointer-Dispatch pointer handling).

2. It provides a more effective priority interrupt mechanism (Level Mask usage) in comparison to conventional prior art pre-wired priority interrupt procedures for reverting control from RU to SU.

3. It reduces the extent of usage and dependency upon serially reusable elements (e.g., fixed store locations).

Comparison of System Operations

Figure 7:
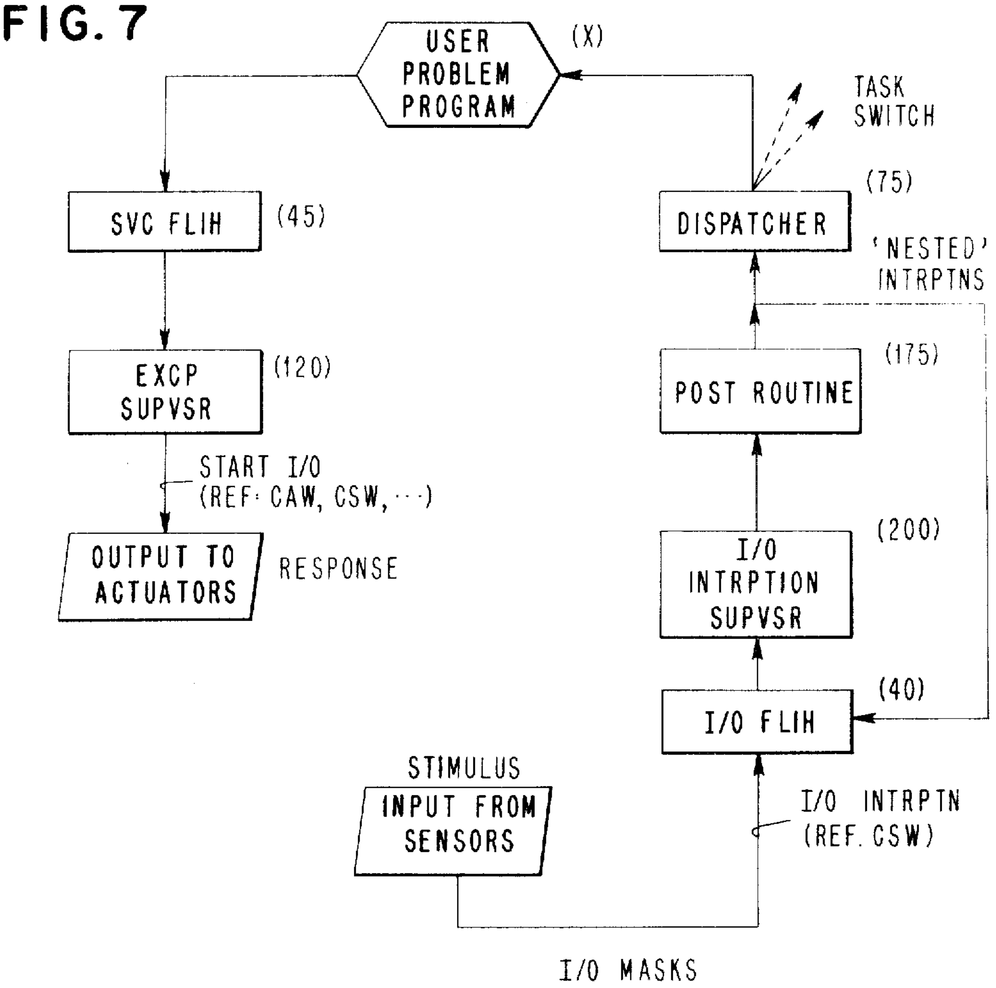
FIG. 7 indicates conventional (OS/360 Release 19) handling of the process control functions of FIG. 6.
Figure 8:
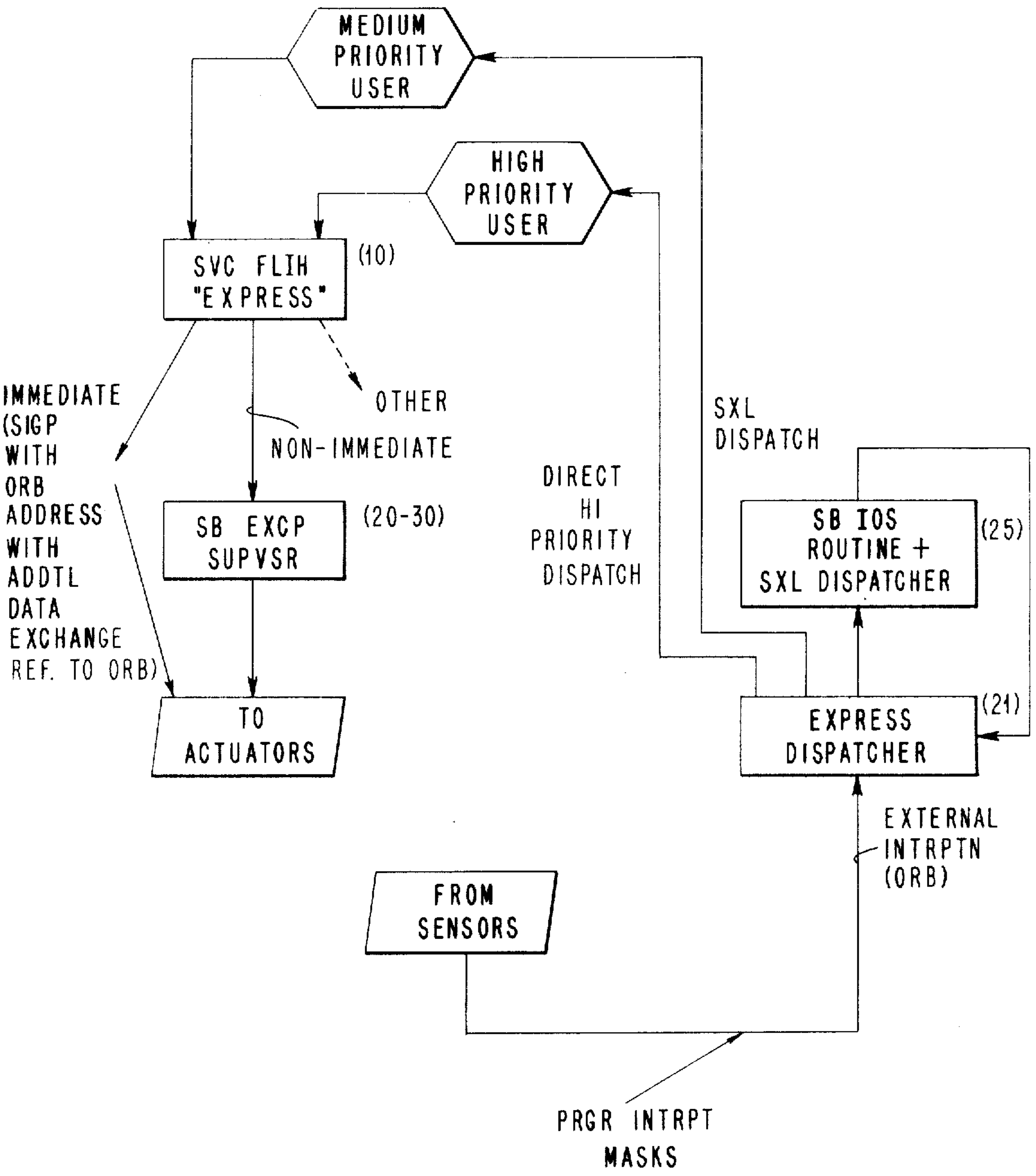
FIG. 8 indicates in comparison to FIG. 7 handling of the process control function using SIGP and ORB as described herein.

FIGS. 7 and 8 are presented merely to provide comparison between conventional handling of I/O tasks for a system such as that of FIG. 6 and the quicker, more direct and more efficient handling achievable through the use of the foregoing dispatch mechanism (SIGP, ORB, ORB Pointer-revertive handling, and masked level interrupt of SU by RU).

Summing the approximate numbers of instructions indicated in parentheses adjacent the various boxes in FIG. 7 indicates that approximately 655+X instructions (X being the number of instructions required to exercise the problem program) would be required normally whereas on the order of less than 100+X instructions should be required using the subject dispatch mechanism.

As indicated in FIG. 7 the stimulus from the sensors undergoes successive handling by first level I/O interruption (FLIH), I/O interruption supervisor, post routine and dispatcher software systems. Then it is processed by the problem program. In between nested interruptions may occur, and if they occur may increase the effective number of instructions substantially. Then the processed data is output to the actuators through handling by the first level interruption supervisor (SVC FLIH), channel program execution supervisor (EXCP SUPERVISOR) and traverses the I/O path elements, through control initiation with Start I/O (involving reference to the CAW, CSW, etc.), to the actuator input converters, etc.

By comparison FIG. 8 shows the sensor stimuli handled with fewer operations through software application of the subject dispatch mechanism. The boxes labelled Express Dispatcher and SLX Dispatcher refer to primary and secondary dispatch routines which may be used to manage multiple sensor/multiplex dispatch functions (i.e., multiple ORB's, etc.). On the outgoing side it is seen that the SIGP-ORB dispatch handling permits further reduction in the number of instruction steps required to carry out the Execute Channel Program supervisor functions.

While the invention has been particularly shown and described with reference to a preferred embodiment thereof, it will be understood by those skilled in the art that various changes in form and detail may be made therein without departing from the spirit and scope of the invention.

What is claimed is:

1. In a data processing system including a controlling unit, a controlled unit organized to communicate with said controlling unit and addressible storage means subject to shared access by both of said units, a method of controlling dispatching interaction between said units, said method comprising:

enabling said units to establish, revertively transfer, and retain a pointer address function specifying a space in said storage means subject to utilization in an operation dispatched to be performed by said controlled unit, said address being subject to revertive transfer to and utilization by said controlling unit at completion of said operation to enable said controlling unit to locate and activate a segment of an interrupted problem program execution of which is contingent upon completion of a said dispatched operation by said controlled unit.

2. In a data processing system including a controlling unit, a controlled unit and addressible storage means subject to shared access at least in part by both of said units, the method of dispatch operation initiation and control comprising:

enabling said controlling unit, under control of a supervisory program to successively: a) allocate a first shared space in said storage means for use in connection with a predetermined operation to be dispatched for execution by said controlled unit; b) prepare said first space with first address pointer information designating a second shared space in said storage means containing a problem program routine of the controlling unit execution of which is contingent upon completion of said dispatched operation; and c) communicate with said controlled unit to transfer second address pointer information designating the location of said first space; and enabling said controlled unit to operate independently after said communication with said controlling unit to successively: a) retain said second pointer information designating the location of said first space; b) while retaining said information perform said dispatched operation and c) initiate communication with said controlling unit to return said retained second pointer information to said controlling unit upon conclusion of said operation; whereby upon or subject to successful conclusion said controlling unit may utilize said returned information to locate said problem program routine for execution.

3. A control method according to claim 2, wherein the first space is arranged to include first and second sub-spaces subject to location by simple arithmetic manipulation of said retained second pointer information; the first sub-space containing said first pointer information and the second sub-space being subject to access by both of said units;

said controlled unit enabling step including sub-steps intermediate sub- steps b) and c) thereof enabling said controlled unit to enter information in said second sub-space indicating the concluding status of said operation using said retained second pointer infor-mation to indirectly locate said second sub-space;

said status information thereby being made available to said controlling unit for inspection upon said return of said retained second pointer information.

4. A control method according to claim 3 wherein said allocation of said first space is subject to termination rendering said space useful for other purposes immediately after return of said second pointer to the controlling unit and inspection of said status information by the controlling unit, conditional upon the inspected status information stored in said second sub-space of said first space indicating successful completion of said operation by said controlled unit.

5. A method according to claim 2 wherein:

said controlling unit enabling step comprises sub-step of having said controlling unit prepare said first space with additional information besides said first pointer; said additional information including a priority level designation; and said communication step initiated by said controlled unit to effect said return of said second pointer comprises having the controlled unit signal a priority interruption request to said controlling unit, at a priority level designated by said priority level designation, subject to acceptance by the controlling unit when it is enabled at the designated level.

6. A method according to claim 2 wherein said preparation of said first space includes a step of having the controlling unit prepare third pointer information in said first space designating a third space containing an I/O command program for specifically controlling the dispatched operation to be performed by said controlled unit, said controlled unit performing said operation by successively obtaining access to said third pointer and command program.

7. In a data processing system including a CPU, and I/O unit and storage means an input-output control method comprising:

enabling said CPU under Supervisory Program control to: a) reserve a serially reusable first space in said storage means, which space is subject to access by both said CPU and said I/O unit, as an Operations Request Block ORB useful in effecting I/O communication between said unit and CPU; b) prepare said ORB space with dispatch pointer information designating a second space in said storage means containing an interrupted/inactive section of a dispatched problem program routine of the CPU which is subject to active reinstatement for running in said CPU only after completion of an I/O operation by said I/O unit c) prepare said ORB space with I/O program pointer information designating a third storage space accessible to said I/O unit containing a program prepared therein by prior operation of said CPU for controlling said I/O unit to perform said I/O operations; and d) establish communication with said I/O unit to supply said I/O unit with ORB pointer information designating the address location of said first space; and enabling said I/O unit to operate after termination of said communication to a) obtain access to and perform said I/O program in said second space; b) enter concluding status in said ORB space, using said ORB pointer information supplied by said CPU to obtain access to said ORB space; c) request interruption of said CPU upon completion of the I/O program operation; and d) upon acknowledgment by said CPU re-transfer the ORB pointer to said CPU for handling in reference to the ORB space; whereby said dispatched problem routine section may be located and placed on active scheduled status.

8. A method according to claim 7, wherein said communication by said CPU to said I/O unit is effected by enabling said CPU and I/O unit to cooperate in executing a control initiating instruction of said CPU dedicated to transferring an order and said ORB pointer to said I/O unit and contingent upon failure to complete said transfer, allowing reverse transfer of specific exception status from said I/O unit to said CPU; said status comprising sufficient information such that further sense interrogation of the I/O unit and communication path elements between said CPU and I/O unit is not required; said I/O unit retaining said order and pointer when successfully transferred for handling in reference to obtaining access to said I/O program and effecting said pointer re-transfer to said CPU.

9. In a data processing system including a controlling unit, a controlled unit, and storage means including a plurality of addressable block storage spaces available for shared access by both of said units, the improved method for dispatching a program operation of said controlling unit conditional upon completion of an ancillary operation of said controlled unit comprising:

enabling said controlling unit to prepare a selected one of said block spaces of said storage means with dispatch information pointing to the address location of a section of a problem program which is subject to execution contingent upon completion of a desired operation of said controlled unit and with additional information and enabling said controlled and controlling units to revertively communicate and retain block pointer information designating the storage location of said selected one space;

enabling said controlling unit to initiate said revertive communication relative to said controlled unit, through the operation of a control initiating instruction of the controlling unit devoted to effecting conditional transfer of said block pointer information along with order information, the pointer information designating the location of said selected one block space, subject to retention and handling by said controlled unit;

enabling said controlled unit to operate independently in response to said order information to utilize said block pointer information to indirectly retrieve a command program locatable through other information prepared in said selected block space, said command program enabling said controlled unit to perform an input/output operation relative to data associated with said dispatched program operation of said controlling unit;

enabling said controlled unit upon conclusion (although not necessarily completion) of its response to said order information to post a request for interruption to said controlling unit; and enabling said controlling unit and controlled unit conditional upon acknowledgment of said interruption request to effect conditional re-transfer of said block pointer information from said controlled unit to said controlling unit for use by the controlling unit, contingent upon completion of said input/output operation by the controlled unit, incidental to locating and re-activating the program for which said operation was initiated.

10. A method according to claim 9 wherein said dispatching operation includes enabling said controlling unit to provide a priority level designation in its said block space during said preparation of said block space and enabling said controlled unit and controlling unit to utilize said level indication cooperatively to accomplish said interruption and re-transfer of pointer custody at a priority level of interruption of the controlling unit which has no greater priority than the designated level, thereby eliminating the possibility of interruption of said controlling unit during performance of a task having higher priority than the dispatched problem program routine section.

11. A method according to claim 9 wherein said dispatching operation includes enabling said controlled unit upon said conclusion of its operation in response to said order to set status indication in said selected block space for utilization by said controlling unit in determining the status of completion of said operation.

* * * * *